Jan. 1, 1957 F. G. BUHRENDORF 2,776,142

INDEXING MEANS FOR SIGNAL RECORDING
AND REPRODUCING APPARATUS

Filed Jan. 21, 1953 2 Sheets-Sheet 1

INVENTOR
F. G. BUHRENDORF
BY V. P. Priolo
ATTORNEY

INVENTOR
F. G. BUHRENDORF
BY V. P. Priolo
ATTORNEY 2,776,142

INDEXING MEANS FOR SIGNAL RECORDING AND REPRODUCING APPARATUS

Frederick G. Buhrendorf, Westfield, N. J., assignor to Bell Telephone Laboratories, Incorporated, New York, N. Y., a corporation of New York Application January 21, 1953, Serial No. 332,189

3 Claims. (Cl. 274—13)

This invention relates to signal recording and reproducing apparatus comprising a transducer and a record member actuated by a common means, and more particularly to means for indexing said transducer and record member with respect to each other.

It is an object of this invention to provide means whereby the transducer and record member of a recording device may be automatically indexed with respect to each other at the starting point of the recorded signals.

The present invention may be employed with particular advantage in recording and reproducing apparatus of the type wherein the signal track is disposed on the record member in the form of a helix and the turns of the helix are relatively large. The record member may be a drum of large diameter or a film or tape several feet in length and formed into an endless band. It will be readily understood that random indexing of such a record member for playback purposes would require the services of an oberver for a relatively long period of listening or observation time. With the present invention the services of an observer are not required.

In accordance with this invention a revolvable record member and a movable transducer carriage are actuated by a common means, the transducer carriage being disposed with respect to a feed screw in such manner as to be actuated thereby for advancement relative to the record member. The indexing means comprises a hollow cam member coaxially affixed to the feed screw and a latch member affixed to the transducer carriage. The cam member includes a slot corresponding to a specified position on the record member. On moving the transducer carriage back to the starting point of its travel the latch member is disposed on the surface of the cam member. The latch member rides on the surface of the revolving cam member until it enters the slot whereupon it operates a switch to deenergize the common actuating means and thereby indexes the transducer with respect to the record member.

The nature of the invention and its distinguishing features and advantages will be more clearly understood from the following detailed description and the accompanying drawings in which.

Figure 1:
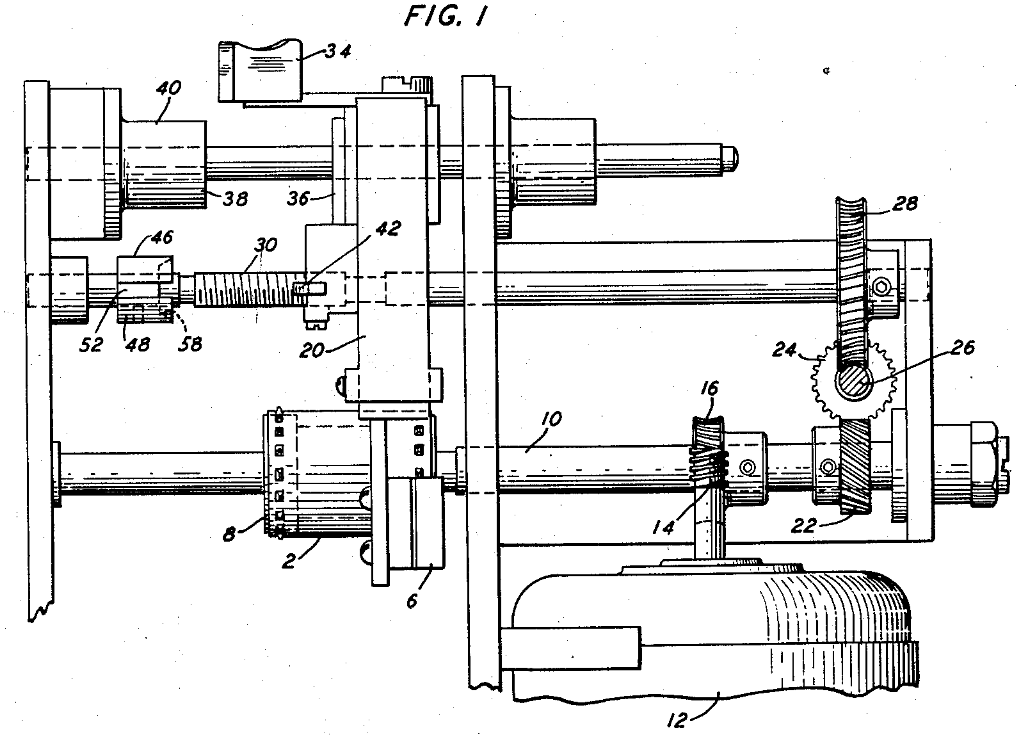
Fig. 1 is a plan view of a preferred embodiment of the present invention.
Figures 2, 3:
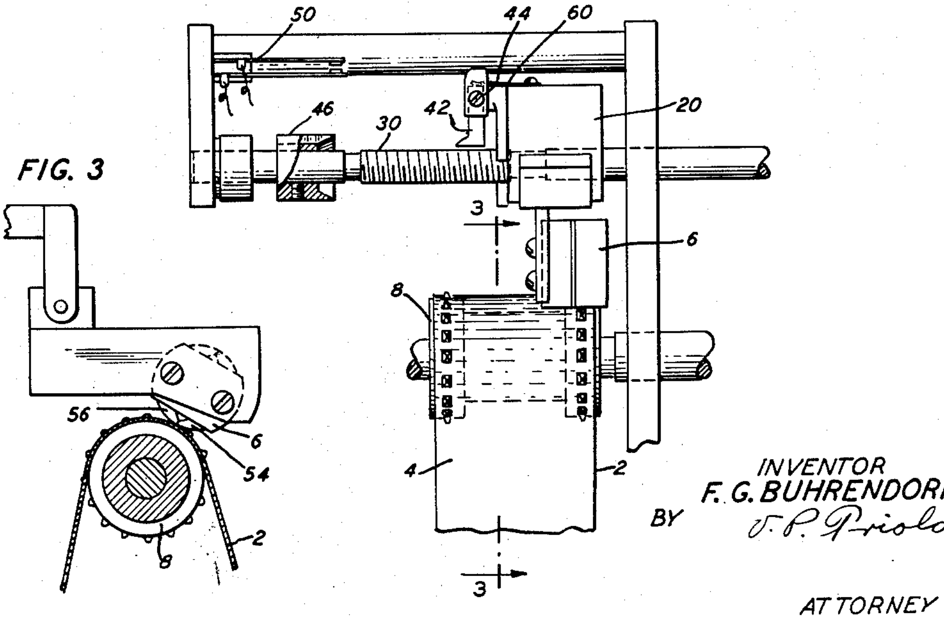
Fig. 2 is a front elevation of the embodiment in Fig. 1, the driving mechanism not being shown.
Fig. 3 is a sectional view taken on the line 3—3 of Fig. 2.

Referring now to the accompanying drawings 2 is the record member, which in the preferred embodiment of the invention is a continuous loop of 35 millimeter film with a magnetizable surface 4. Signals may be recorded on the member 2 and reproduced therefrom by means of the electromagnetic transducer 6. The record member 2 is supported by a suitable conventional arrangement of rollers which are not shown. Motion is imparted to the record member 2 by means of the sprocket 8 which is in turn actuated through the shaft 10, to which it is attached, by means of the motor 12 and the gears 14 and 16.

The transducer 6, which is supported by the carriage 20, is also actuated by the motor or common means 12. This is accomplished by the conventional arrangement comprising the gears 22, 24, 26 and 28, the lead screw 30 driven by the gear 28, and the half nut 32, which is a component of the carriage 20 and engages the lead screw 30.

Figure 4:
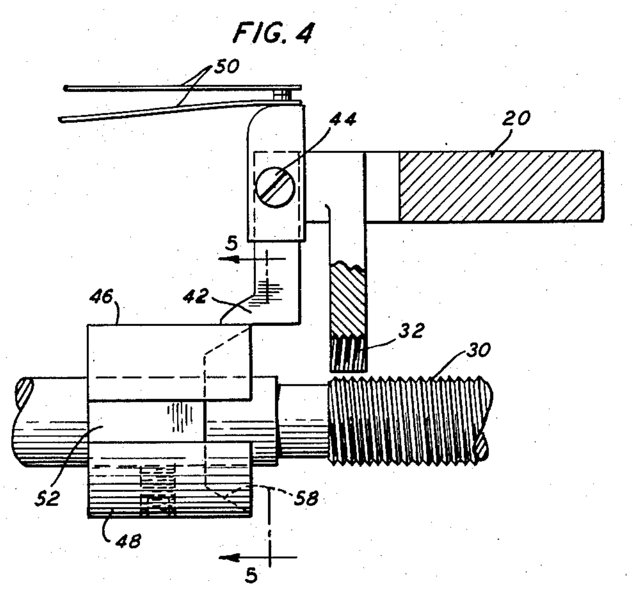
Fig. 4 is a detailed view showing the relative position of the latch and the cam surface at the beginning of the indexing cycle.
Figure 5:
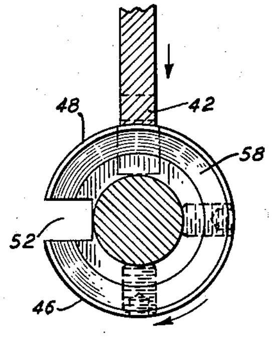
Fig. 5 is a sectional view taken on the line 5—5 of Fig. 4.
Figure 6:
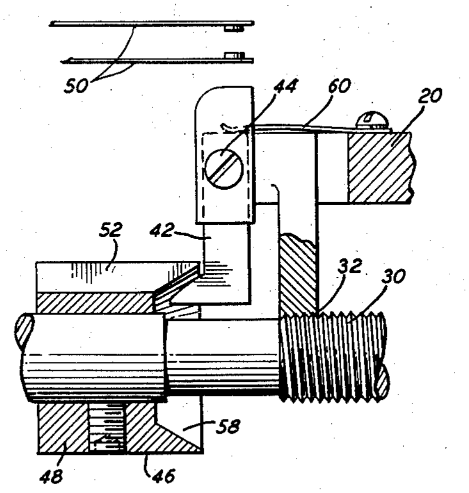
Fig. 6 is a detailed view showing the relative position of the latch and the cam surface at the end of the indexing cycle.

Through the common actuating means comprising the motor 12, the shaft 10, and the lead screw 30, motion is imparted simultaneously to the record member 2 and the transducer 6 which traverses the record member and disposes thereon a helical signal track. In order to play back or reproduce the signals recorded the transducer must be indexed with respect to the record member. In order to accomplish this the half nut 32 of the carriage 20 is disengaged from the lead screw 30 and the carriage is moved manually by means of the arm 34 until the face 36 of carriage 20 contacts the face 38 of the stop 40. The latch member 42 which is attached to the carriage 20 by means of the pivot pin 44 is then allowed to ride on the surface 46 of the cam 48 which is coaxially affixed to the lead screw 30. As shown in Fig. 4, when the latch member 42 is disposed on the cam surface 46, the contacts of the switch 50 are closed. The closing of switch 50 at this point provides power to the motor 12 which had been deenergized prior to the disengagement of the carriage 20 from the lead screw 30. Motion is again imparted to the record member 2 and the lead screw 30. However, since the half nut 32 is not in engagement with the lead screw no motion is imparted to the transducer 6.

The cam 48 is provided with a slot 52 which, when aligned with the latch 42, corresponds to the starting point of the signal track disposed on the record member 2. It is, of course, understood that slot 52, when aligned with latch 42, will correspond to the starting point of the signal track as long as the gear ratio between lead screw 30 and shaft 10, the diameter of sprocket 8 and the length of the tape loop 2, are selected in such manner that the lead screw completes one revolution while the tape loop completes an integral number of revolutions. The latch member 42 rides on the cam surface 46 until it enters the slot 52 whereupon the switch 50 is opened and the motor 12 is deenergized. The half nut 32 engages the lead screw 30, which is so oriented with respect to the thread in the half nut that complete engagement takes place without axial motion of the carriage, and the pole tips 54 and 56 of transducer 6 are disposed with respect to the record medium 2 at the starting point of the recorded signal. The transducer and record member are thereby indexed for playback or reproduction of the signal. The cam 48 is undercut to clear the cam follower or latch member 42 after it has fallen through the slot 52 in the cam surface 46. This permits rotation of the cam without interference from the cam follower when the transducer and record member are again actuated.

Figure 7:
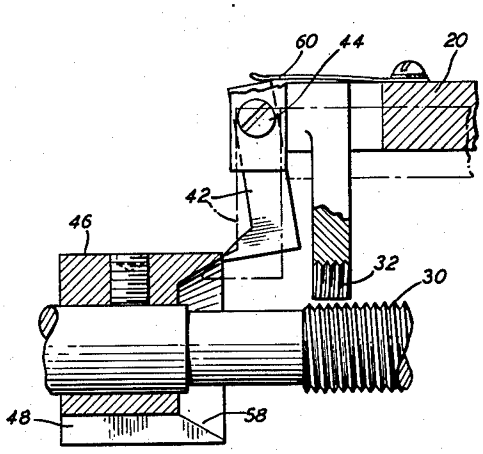
Fig. 7 is a detailed view showing the pivotal support for the latch which permits lifting of the transducer carriage and the latch before the latch has cleared the cam.

Since a single complete loop of the record member 2 contains a relatively lengthy signal record there may be occasion to play back the record after the transducer 6 has recorded one or a few turns of the helical track. Under these conditions the transducer 6 will not have traveled the distance required for the latch member 42 to clear the cam 48. In order to permit the disengagement of the carriage 20 from the lead screw 30 before the latch member has cleared the cam, the latch member is attached to the carriage by means of the pivot pin 44, and the undercut portion of the cam is beveled. As shown in Fig. 7 the latch member pivots on the pin 44 when it frictionally engages the beveled undercut portion 58 of the cam and thereby clears the cam on being lifted. It is restored to its normal position after it has cleared the cam by the spring member 60 which has one end affixed to the carriage 20 and the free end engaging the latch member to resist its pivotal motion.

The signals recorded on the record member 2 may be erased by any suitable conventional method or by the bulk erase method disclosed in patent application Serial No. 250,860 filed on October 11, 1951, now U. S. Pat. No. 273,300.

It is to be understood that the above-described arrangements are illustrative of the application of the principles of the invention. Other arrangements may be devised by those skilled in the art without departing from the spirit and scope of the invention.

What is claimed is:

1. In a signal recording and reproducing apparatus comprising a transducer and a record member actuated by a common means, a feed screw, a carriage attached to said transducer and engaged by said feed screw for advancement relative to said record member from an established starting point, said feed screw completing one revolution while said record member completes an integral number of revolutions, a cylindrical cam member coaxially affixed to said feed screw, a latch member attached to said carriage and adapted to be disposed on the surface of said cam member on disengaging said carriage from said feed screw and moving said carriage to said starting point of its travel, a slot in the surface of said cam member adapted to be entered by said latch member to permit reengagement of said carriage and said feed screw, said slot, when aligned to receive said latch member with said carriage at said starting point, corresponding to a specified position on said record member, a switch member operable by said latch member when said latch member is disposed on the surface of said cam member and said carriage is at said starting point to energize said common actuating means and thereby cause said cam member to rotate and said latch member to follow the surface of said cam member, said switch member being operable by said latch member when said latch member falls through said slot to deenergize said common actuating means and thereby arrest the motion of said cam member, said cam member having a beveled undercut portion to permit rotation thereof without interference from said latch member after said latch member has fallen through said slot, said latch member being pivotally attached to said carriage to permit pivotal motion thereof when lifted against the beveled undercut portion of said cam member, whereby said carriage may be lifted and disengaged from said feed screw without interference from said cam member before said latch member has traveled the distance required to clear said cam member.

2. A recording and reproducing apparatus in accordance with claim 1 wherein pivotal motion of said latch member is resisted by a spring member mounted on said carriage.

3. A recording and reproducing apparatus in accordance with claim 1 wherein said transducer is an electromagnetic recording-reproducing head and said record member is magnetizable.

References Cited in the file of this patent

UNITED STATES PATENTS 2,235,301 Robinson ------------- Mar. 18, 1941